(12) United States Patent
Pantin et al.

(10) Patent No.: US 11,736,645 B2
(45) Date of Patent: Aug. 22, 2023

(54) PRINT PROCESSING SYSTEM THAT TRANSMITS PRINT DATA FROM TERMINAL DEVICE TO ONE OF PLURALITY OF IMAGE FORMING APPARATUSES, ACCORDING TO INFORMATION WRITTEN IN MEMORY OF MOBILE DEVICE

(71) Applicant: KYOCERA Document Solutions Inc., Osaka (JP)

(72) Inventors: Carl Christian Ray Pantin, Osaka (JP); Deniel Molina, Osaka (JP); Icel Ann Rodriguez, Osaka (JP); Jesus Jovannie John Burgos, Osaka (JP); John James Gutib, Osaka (JP); John Mathew Cabido, Osaka (JP); Matthew Grafilo, Osaka (JP); Melvin Gaviola, Jr., Osaka (JP); Nixon Segarra, Jr., Osaka (JP); Rodney Omangayon, Osaka (JP); Shiela Mae Quimbo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/872,740

(22) Filed: Jul. 25, 2022

(65) Prior Publication Data
US 2023/0041728 A1 Feb. 9, 2023

(30) Foreign Application Priority Data
Aug. 4, 2021 (JP) ................. 2021-128559

(51) Int. Cl.
*H04N 1/32* (2006.01)
*H04N 1/00* (2006.01)
*H04N 1/44* (2006.01)

(52) U.S. Cl.
CPC ..... *H04N 1/32122* (2013.01); *H04N 1/00307* (2013.01); *H04N 1/4413* (2013.01); *H04N 2201/3205* (2013.01)

(58) Field of Classification Search
None
See application file for complete search history.

(56) References Cited

U.S. PATENT DOCUMENTS

9,740,443 B2  8/2017  Inoue
2015/0002879 A1  1/2015  Naruse
(Continued)

*Primary Examiner* — Haris Sabah
(74) *Attorney, Agent, or Firm* — IP Business Solutions, LLC (57) ABSTRACT

A print processing system includes a plurality of image forming apparatuses, a terminal device, and a mobile device. A first controller of the terminal device is capable of writing information necessary for transmitting the print data, in the memory of the mobile device. A second controller of the image forming apparatus executes, upon reading out the necessary information written by the first controller from the memory of the mobile device, via the second wireless communication device, a first process necessary for transmitting the print data. A second controller of the image forming apparatus is capable of writing the necessary information in the memory of the mobile device. The first controller of the terminal device executes, upon reading out the necessary information written by the second controller from the memory of the mobile device, via the first wireless communication device, a second process necessary for transmitting the print data.

6 Claims, 11 Drawing Sheets

(56) References Cited

U.S. PATENT DOCUMENTS

| | | | |
|---|---|---|---|
| 2015/0092214 A1* | 4/2015 | Takiguchi | H04N 1/00384 358/1.13 |
| 2015/0092233 A1* | 4/2015 | Park | H04N 1/00244 358/1.15 |
| 2016/0011835 A1* | 1/2016 | Igarashi | G06F 3/1292 358/1.15 |
| 2019/0037086 A1* | 1/2019 | Tokuchi | H04N 1/00424 |
| 2019/0361633 A1* | 11/2019 | Wang | G06F 3/1222 |
| 2023/0176801 A1* | 6/2023 | Chin | G06Q 20/145 358/1.15 |

* cited by examiner

PRINT PROCESSING SYSTEM THAT TRANSMITS PRINT DATA FROM TERMINAL DEVICE TO ONE OF PLURALITY OF IMAGE FORMING APPARATUSES, ACCORDING TO INFORMATION WRITTEN IN MEMORY OF MOBILE DEVICE

INCORPORATION BY REFERENCE

This application claims priority to Japanese Patent Application No. 2021-128559 filed on Aug. 4, 2021, the entire contents of which are incorporated by reference herein.

BACKGROUND

The present disclosure relates to a print processing system including a plurality of image forming apparatuses, a terminal device, and a mobile device.

In an office or the like, a plurality of multifunction peripherals or image forming apparatuses such as printers are often installed. Preparing an environment where the user can effectively utilize the plurality of image forming apparatuses, such that the user can freely and easily utilize any of the image forming apparatuses, leads to improved efficiency of the user's operation. For example, when the user can transmit print data to a printer installed nearby, from the personal computer (PC) that the user is currently using, the user can obtain the printed material from the printer installed nearby, which is quite convenient to the user.

SUMMARY

The disclosure proposes further improvement of the foregoing techniques.

In an aspect, the disclosure provides print processing system including a plurality of image forming apparatuses, a terminal device, and a mobile device. The mobile device includes a memory. The terminal device includes a first communication device, a first wireless communication device, a storage device, and a first control device. The first communication device communicates with each of the plurality of image forming apparatuses via a network. The first wireless communication device performs short-range wireless communication with the mobile device. In the storage device, print data is stored. The first control device includes a processor, and acts as a first controller, when the processor executes a first control program. The first controller transmits the print data to one of the plurality of image forming apparatuses, via the first communication device. The plurality of image forming apparatuses each include a second communication device, a second wireless communication device, an image forming device, and a second control device. The second communication device communicates with the terminal device, via the network. The second wireless communication device performs the short-range wireless communication with the mobile device. The image forming device forms an image on a recording medium. The second control device includes a processor, and acts as a second controller, when the processor executes a second control program. Upon receipt of the print data via the second communication device, the second controller controls the image forming device so as to form an image based on the print data, on the recording medium. The first controller of the terminal device is capable of writing, via the first wireless communication device, information necessary for transmitting the print data in the memory of the mobile device, and the second controller of the image forming apparatus executes, upon reading out the necessary information written by the first controller from the memory of the mobile device, via the second wireless communication device, a first process necessary for transmitting the print data. The second controller of the image forming apparatus is capable of writing, via the second wireless communication device, the necessary information in the memory of the mobile device, and the first controller of the terminal device executes, upon reading out the necessary information written by the second controller from the memory of the mobile device, via the first wireless communication device, a second process necessary for transmitting the print data.

DETAILED DESCRIPTION

Figure 1:
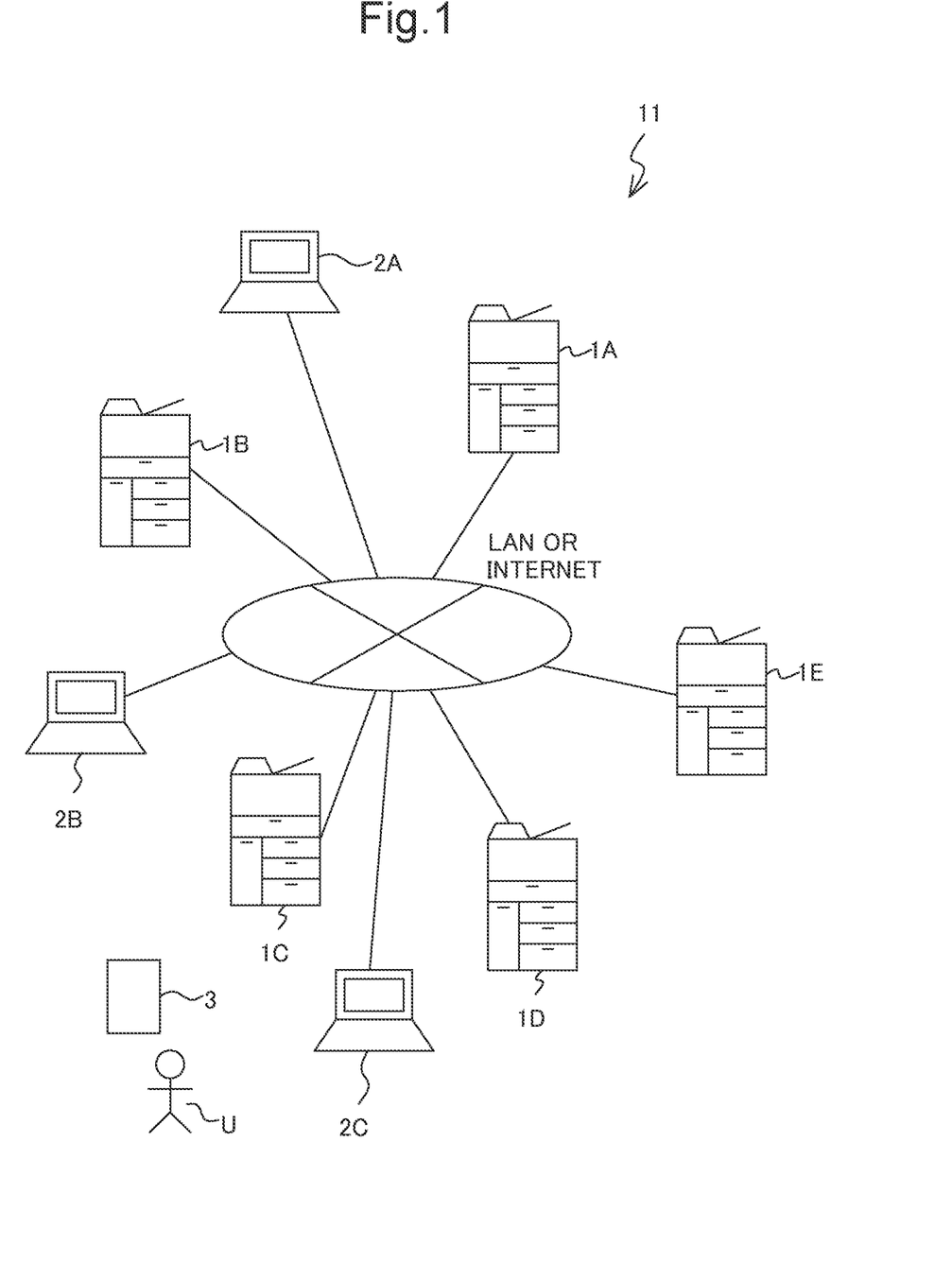
FIG. 1 is a schematic diagram showing a general configuration of a print processing system according to an embodiment of the disclosure.

Hereafter, a print processing system according to some embodiments of the disclosure will be described, with reference to the drawings. FIG. 1 is a schematic diagram showing a general configuration of a print processing system 11 according to a first embodiment of the disclosure.

The print processing system 11 according to the first embodiment includes a plurality of image forming apparatuses 1A to 1E (hereinafter collectively referred to as "image forming apparatus 1", where appropriate), and a plurality of terminal devices 2A to 2C (hereinafter collectively referred to as "terminal device 2", where appropriate), located on a network such as the internet, and a mobile device 3 that can be carried by a user U.

The image forming apparatuses 1A to 1E, the terminal devices 2A to 2C, and the mobile device 3 are each capable of performing short-range wireless communication, with an external device. The image forming apparatuses 1A to 1E and the terminal devices 2A to 2C are capable of communicating with each other via the network.

The image forming apparatus 1 is a multifunction peripheral having a plurality of functions, such as copying, printing, scanning, and facsimile transmission. The information processing apparatus 2 is, for example, a PC. The terminal device 2 has a function to transmit print data of a file to be printed, to the image forming apparatus 1. The mobile device 3 is, for example, a near-field communication (NFC) tag, a card having the NFC tag, or a mobile terminal device having the NFC function. In this embodiment, the mobile device 3 is the card having the NFC tag.

Figure 2:
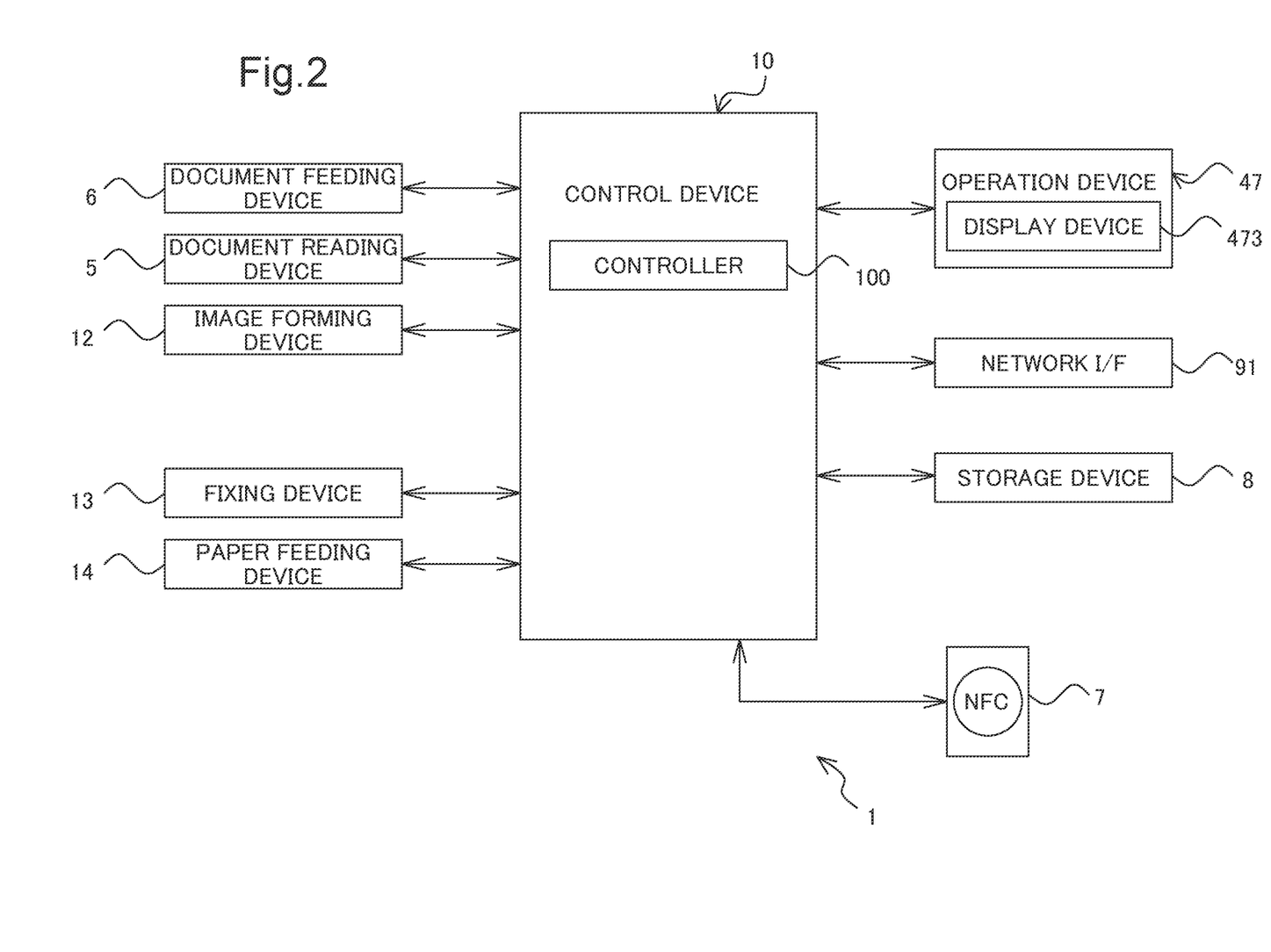
FIG. 2 is a functional block diagram schematically showing an essential internal configuration of an image forming apparatus.

FIG. 2 is a functional block diagram schematically showing an essential internal configuration of the image forming apparatus 1. The image forming apparatus 1 includes a control device 10, a document feeding device 6, a document reading device 5, an image forming device 12, a fixing device 13, a paper feeding device 14, an operation device 47, a network interface (I/F) 91, a storage device 8, and a reader-writer 7.

The document feeding device 6 is openably connected to the upper face of the document reading device 5, for example via a hinge. The document feeding device 6 serves as a document retention cover, when the document reading device 5 reads a source document placed on the platen glass. The document feeding device 6 is configured as an automatic document feeder (ADF). The document feeding device 6 includes a document tray, and delivers the source documents placed thereon one by one, to the document reading device 5.

To perform the document reading operation, the image forming apparatus 1 operates as follows. The document reading device 5 optically reads the image on the source document delivered from the document feeding device 6 to the document reading device 5, or placed on the platen glass, and generates image data. The image data generated by the document reading device 5 is stored, for example, in an image memory.

To perform the image forming operation, the image forming apparatus 1 operates as follows. The image forming device 12 forms a toner image on a recording sheet, serving as a recording medium, delivered from the paper feeding device 14, on the basis of the image data generated through the document reading operation, or image data received from a computer (e.g., terminal device 2), acting as an external device connected via a network.

The fixing device 13 heats and presses the recording sheet on which the toner image has been formed by the image forming device 12, to thereby fix the toner image on the recording sheet. The recording sheet that has undergone the fixing process is delivered to an output tray. The paper feeding device 14 includes a paper cassette.

The storage device 8 is a large-capacity storage device such as a hard disk drive (HDD) and a solid-state drive (SSD). The storage device 8 contains various control programs.

The operation device 47 receives instructions from the user to execute the functions and operations that the image forming apparatus 1 is configured to perform (e.g., instruction to execute the printing operation). The operation device 47 includes a display device 473 for displaying, for example, an operation guide for the user. The operation device 47 receives, through the touch panel provided on the display device 473, the user's instruction based on the touch operation performed by the user on the operation screen displayed on the display device 473, or on a physical key.

The display device 473 includes, for example, a liquid crystal display (LCD). The display device 473 includes the touch panel. When the user touches a button or a key displayed on the screen, the touch panel detects the instruction corresponding to the touched position.

The network I/F 91 is a communication interface that transmits and receives various types of data to and from an external device inside the local area, or on the internet (e.g., terminal device 2).

The reader-writer 7 is a terminal device for performing contactless short-range wireless communication with the mobile device 3, which is the external device. The reader-writer 7 is capable of reading information written a memory 30 (see FIG. 3) incorporated in the mobile device 3 that has come close to the reader-writer 7, writing information in the memory 30, and erasing the information in the memory 30.

The control device 10 of the image forming apparatus 1 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as a controller 100, when the processor operates according to a control program stored in the storage device 8. Here, the controller 100 may be constituted in the form of a hardware circuit, instead of being realized by the operation of the control device 10 according to the control program. This also applies to other embodiments, unless otherwise specifically noted.

The controller 100 serves to control the overall operation of the image forming apparatus 1. The controller 100 is connected to the document feeding device 6, the document reading device 5, the image forming device 12, the fixing device 13, the paper feeding device 14, the operation device 47, the network I/F 91, the storage device 8, and the reader-writer 7, and controls the operation of the mentioned components. For example, the controller 100 controls the image forming device 12 and the related components so as to form an image on the recording sheet, on the basis of the print data received from the terminal device 2 via the network, thereby creating a printed material. Here, the controller 100 exemplifies the second controller in the disclosure.

Figure 3:
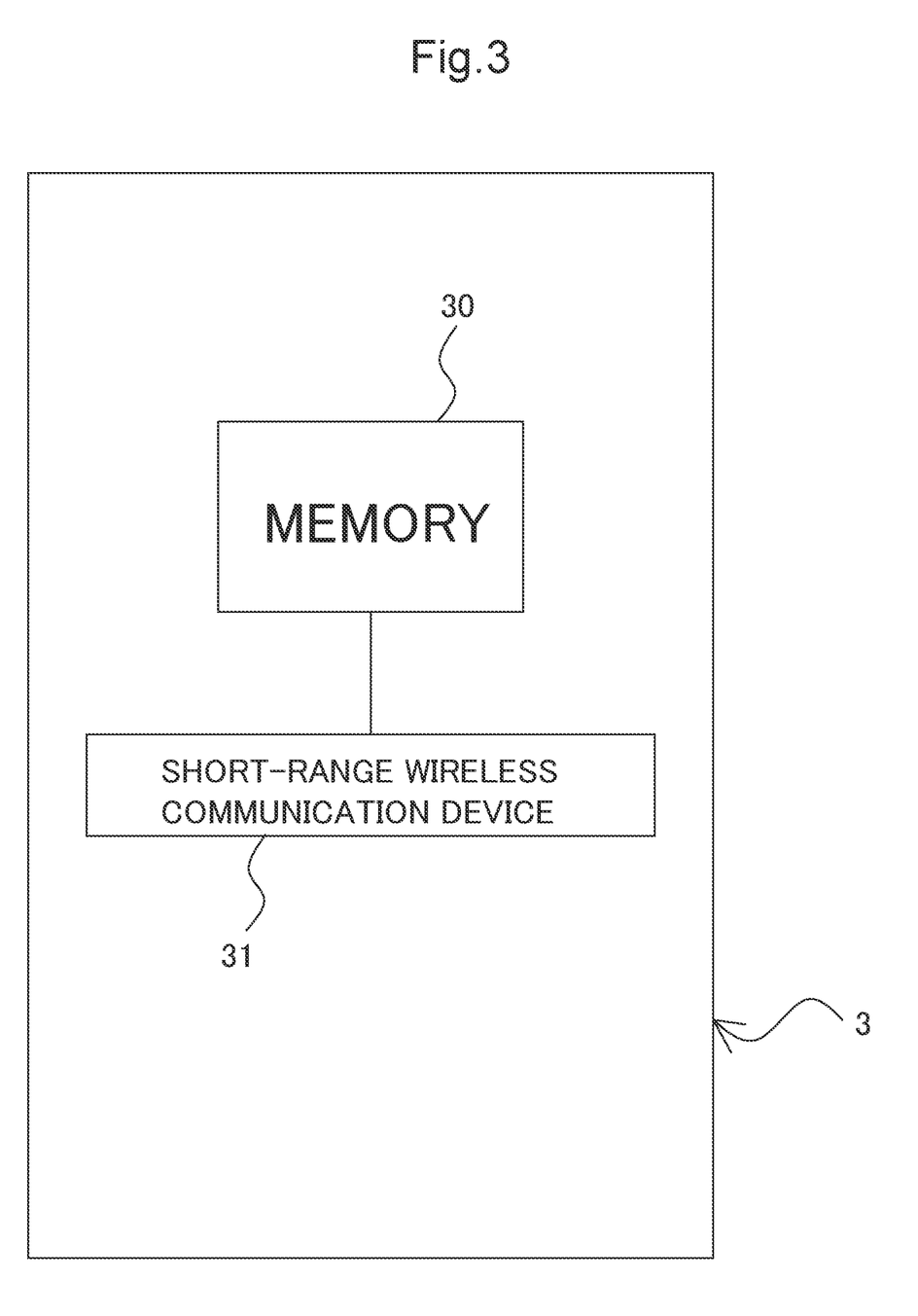
FIG. 3 is a functional block diagram schematically showing an essential internal configuration of a mobile device.

FIG. 3 is a functional block diagram schematically showing an essential internal configuration of the mobile device 3 according to the first embodiment. The mobile device 3 includes a memory 30 from and in which information can be read and written, and a short-range wireless communication device 31.

The short-range wireless communication device 31 includes a circuit for reading or writing information from and in the memory 30, according to a command from the external device, with which connection by the short-range wireless communication has been established (e.g., image forming apparatus 1 or terminal device 2).

Figure 4:
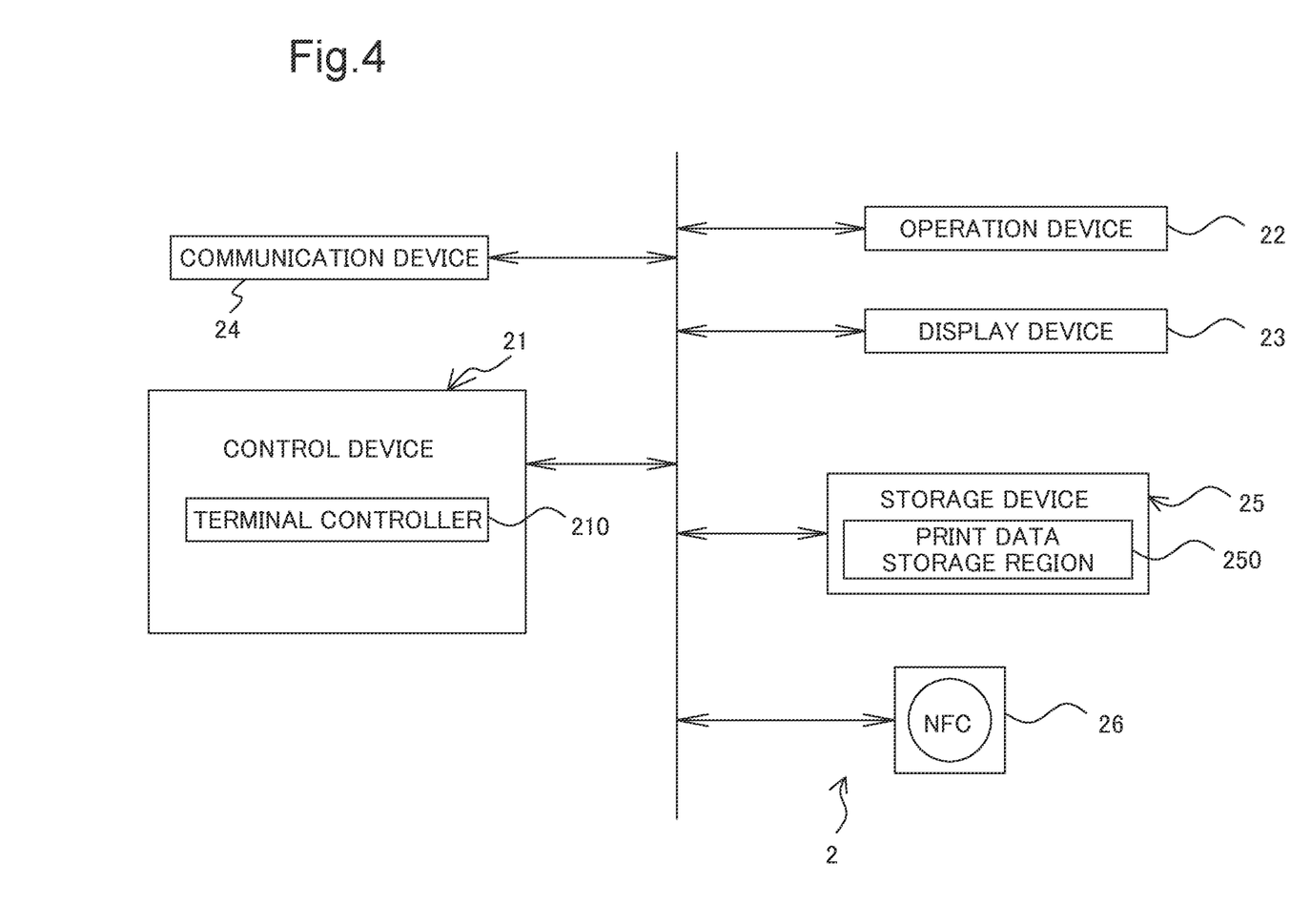
FIG. 4 is a functional block diagram schematically showing an essential internal configuration of a terminal device.

FIG. 4 is a functional block diagram schematically showing an essential internal configuration of the terminal device 2 according to the first embodiment. The terminal device 2 includes a control device 21, an operation device 22, a display device 23, a communication device 24, a storage device 25, and a reader-writer 26. These components are configured to transmit and receive data and signals to and from each other, via a communication path.

The operation device 22 includes a keyboard, a mouse, and so forth. The operation device 22 receives various instructions, according to the operation performed thereon by the user. The operation device 22 outputs a command or characters to a terminal controller 210 to be subsequently described.

The display device 23 includes, for example, an LCD. The terminal controller 210 controls the displaying operation of the display device 23.

The communication device 24 is a communication interface that transmits and receives various types of data to and from external devices inside the local area or on the internet, such as the image forming apparatus 1.

The storage device 25 is a large-capacity storage device such as an HDD or an SSD. The storage device 25 contains various control programs. The storage device 25 includes a print data storage region 250, which will be subsequently described.

The reader-writer 26 is a terminal device for performing contactless short-range wireless communication with the mobile device 3, which is the external device. The reader-writer 26 is capable of reading information written a memory 30 incorporated in the mobile device 3 that has come close to the reader-writer 26, writing information in the memory 30, and erasing the information in the memory 30.

The control device 21 includes a processor, a RAM, a ROM, and an exclusive hardware circuit. The processor is, for example, a CPU, an ASIC, or an MPU.

The control device 21 acts as a terminal controller 210, when the processor operates according to a control program stored in the storage device 25. Here, the terminal controller 210 may be constituted in the form of a hardware circuit, instead of being realized by the operation of the control device 21 according to the control program. This also applies to other embodiments, unless otherwise specifically noted.

The terminal controller 210 serves to control the overall operation of the terminal device 2. The terminal controller 210 is connected to the operation device 22, the display device 23, the communication device 24, the storage device 25, and the reader-writer 26, and controls the operation of the mentioned components.

Figure 5A:
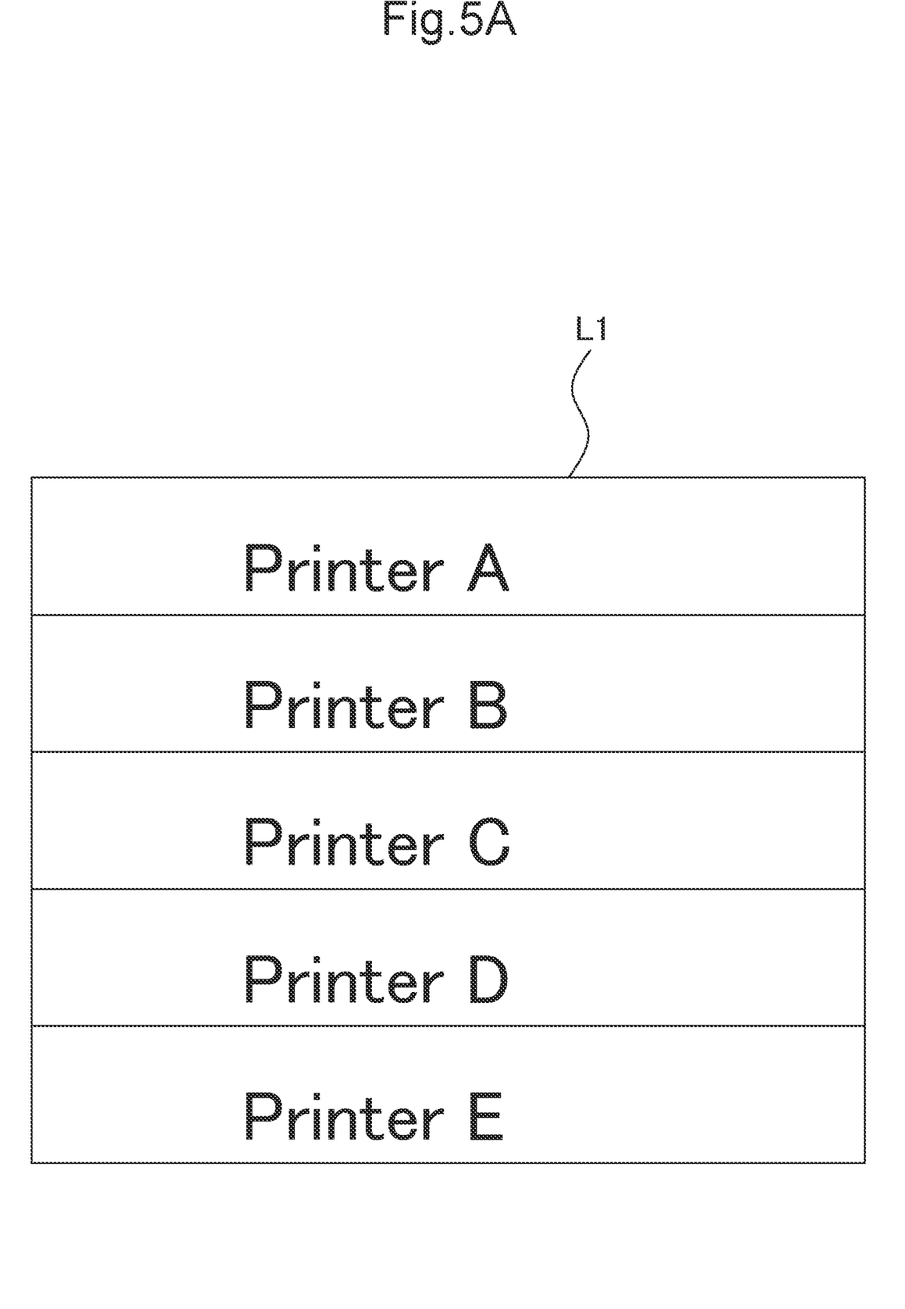
FIG. 5A and FIG. 5B are schematic drawings each showing an example of a printer list.

For example, when the operation device 22 receives the user's selection of the file to be printed, the terminal controller 210 causes the display device 473 to display a printer list L1 as shown in FIG. 5A, for the user to select the image forming apparatus 1 to be caused to execute the printing, out of the image forming apparatuses 1A to 1E connected to the terminal device 2 via the network. Printer A to Printer E included in the printer list L1 respectively represent the name of the image forming apparatuses 1A to 1E. When the user touches the position where the image forming apparatus 1 to be caused to execute the printing is displayed in the printer list L1, the terminal controller 210 receives, through the touch panel, a first selection instruction designating the image forming apparatus 1 corresponding to the touched position as the image forming apparatus 1 to be caused to execute the printing.

Upon receipt of the first selection instruction, and then the printing instruction from the user through the operation device 22, the terminal controller 210 transmits the print data of the file to be printed to the image forming apparatus 1 indicated by the first selection instruction (one of the image forming apparatuses 1A to 1E), via the communication device 24.

Upon receipt of the print data transmitted from the terminal device 2, the controller 100 of the image forming apparatus 1 controls the image forming device 12 and the related components so as to form an image on the recording sheet, according to the print job received.

Figure 5B:
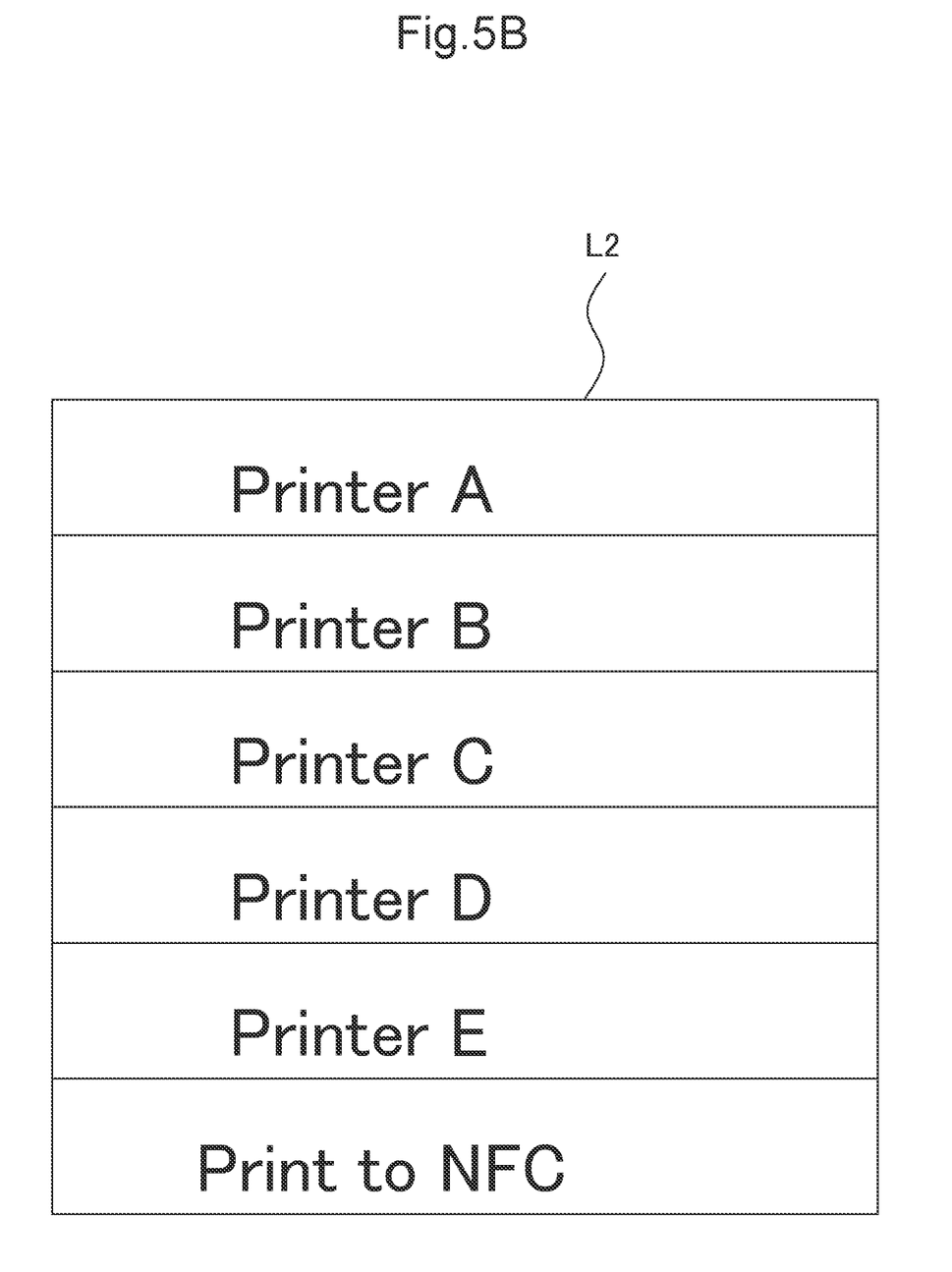

The terminal device 2 also has a "virtual printer" function, newly proposed in this embodiment. Under the state where this function is validated, the terminal controller 210 causes the display device 473, for example when the operation device 22 receives the user's selection of the file to be printed, to display a printer list L2 as shown in FIG. 5B. The printer list L2 exhibits "Print to NFC" as the name of the virtual printer.

When the user touches the position where the "Print to NFC" is displayed in the printer list L2, the terminal controller 210 receives a second selection instruction for selecting the virtual printer, through the touch panel, and stores the print data of the file to be printed, in the print data storage region 250.

Figure 6:
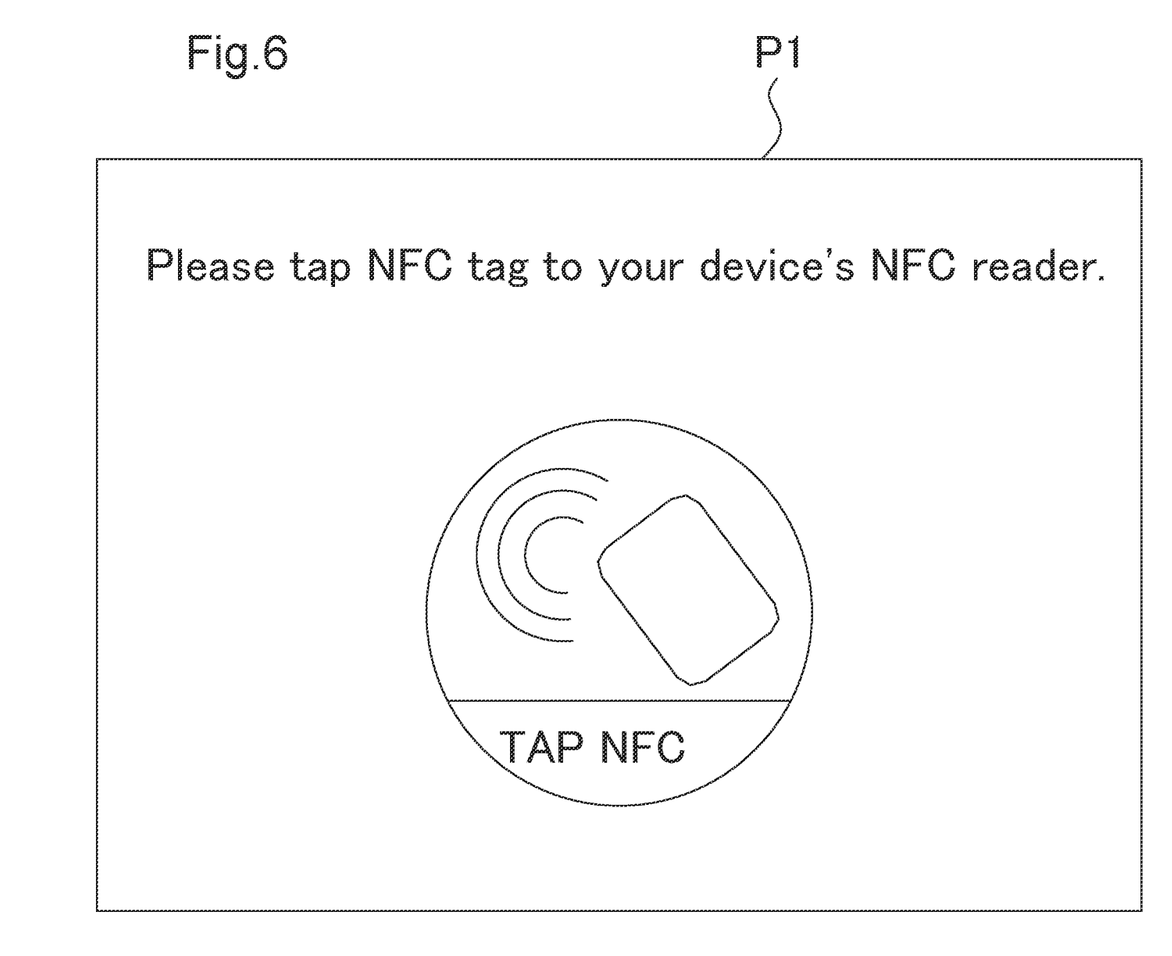
FIG. 6 is a schematic drawing showing an example of a pop-up screen.

After storing the print data of the file to be printed in the print data storage region 250, the terminal controller 210 causes the display device 473 to display a pop-up screen P1 as shown in FIG. 6. This display urges the user to tap the reader-writer 26 with the mobile device 3.

When the user brings the mobile device 3 close to the reader-writer 26, the connection by the short-range wireless communication between the mobile device 3 and the terminal device 2 is established, via the reader-writer 26.

The terminal controller 210 writes the address of the terminal device 2, and an ID code (e.g., file name) for identifying the print data stored in the print data storage region 250, in the memory 30 of the mobile device 3, with which the connection by the short-range wireless communication has been established, via the reader-writer 26.

The mentioned information written in the memory 30 of the mobile device 3 is transmitted to the image forming apparatus 1, when the user carrying the mobile device 3 moves to the image forming apparatus 1, and brings the mobile device 3 close to the reader-writer 7 of the image forming apparatus 1. In other words, the mobile device 3 serves as the transmission medium between the terminal device 2 and the image forming apparatus 1.

Figure 7:
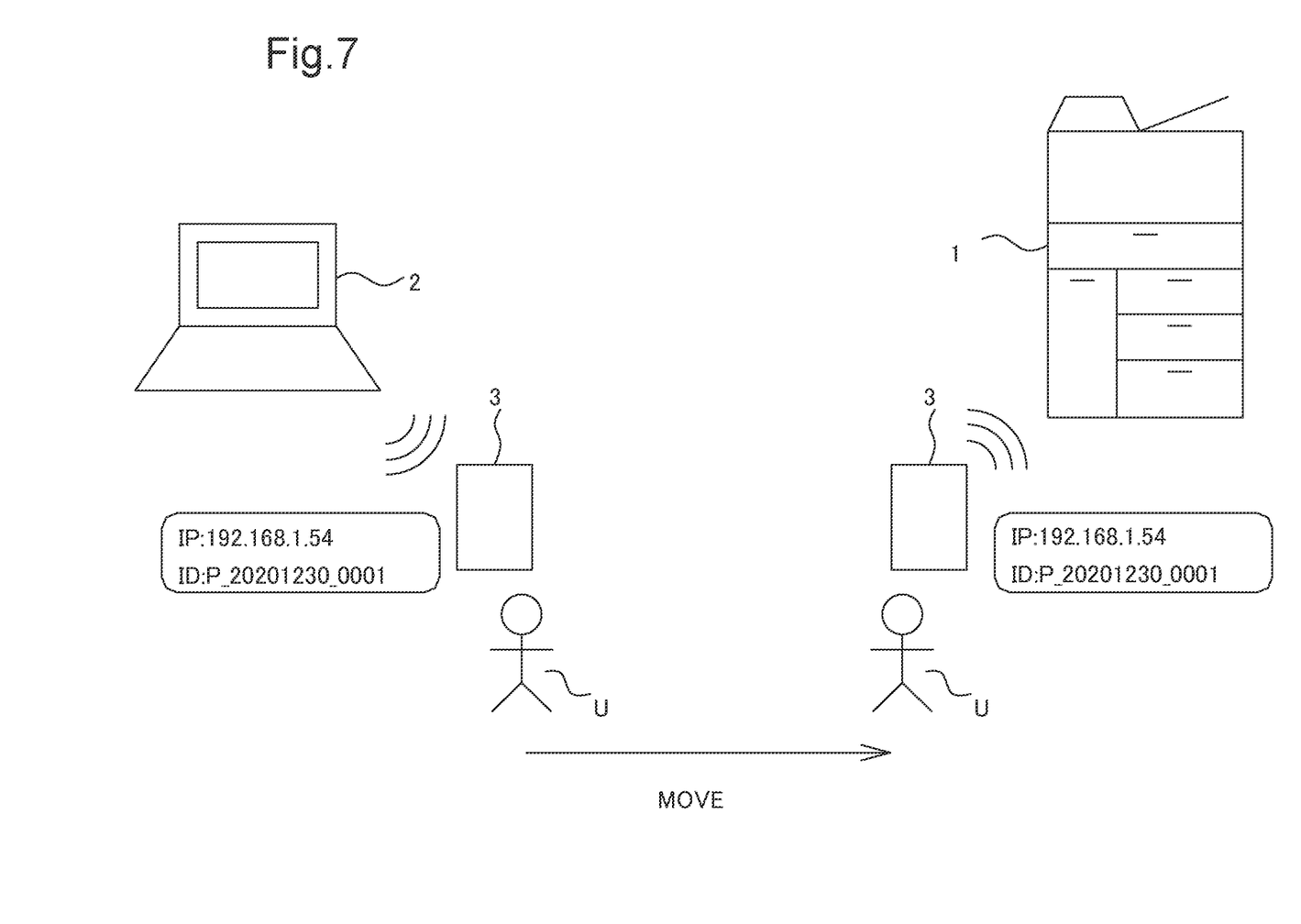
FIG. 7 is a schematic diagram for explaining an exemplary case where information of the terminal device is transmitted to the image forming apparatus by the intermediation of the mobile device.

FIG. 7 illustrates an exemplary case where the information of the terminal device 2 is transmitted to the image forming apparatus 1, by the intermediation of the mobile device 3. The IP address "192.168.1.54" of the terminal device 2, and the ID code "P_20201230_0001" for identifying the print data are transmitted to the image forming apparatus 1, by the intermediation of the mobile device 3.

Figure 8:
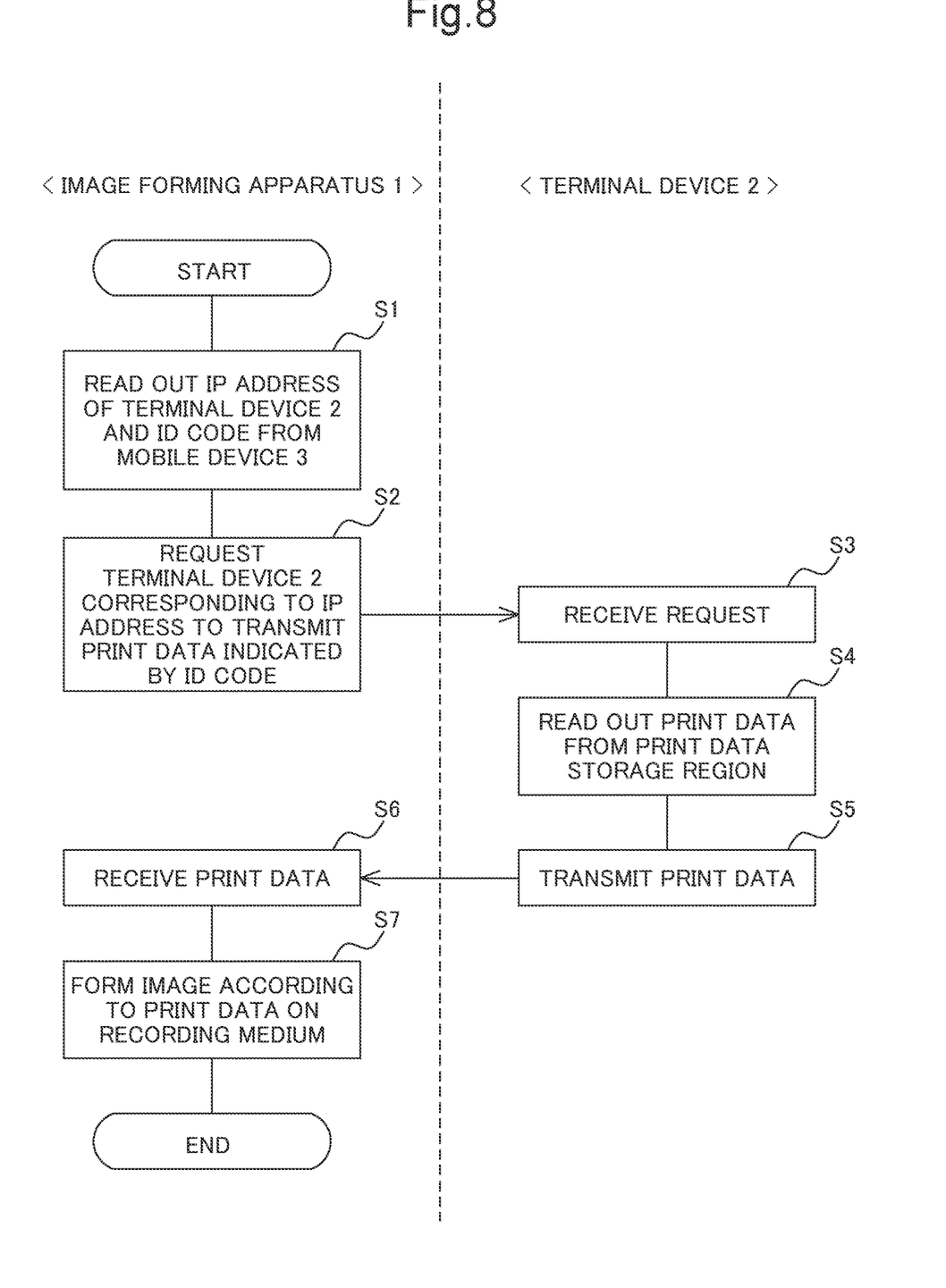
FIG. 8 is a flowchart showing an example of a first information transmission process.

Referring now to a flowchart shown in FIG. 8, a first information transmission process performed by the image forming apparatus 1 and the terminal device 2 will be described, from the point where the image forming apparatus 1 reads out the address of the terminal device 2 and the ID code from the mobile device 3, to the point where the image forming apparatus 1 executes the printing.

The controller 100 of the image forming apparatus 1 reads out the address of the terminal device 2 and the ID code from the memory 30 in the mobile device 3, with which the connection by the short-range wireless communication has been established, via the reader-writer 7 (step S1). After step S1, the controller 100 requests, via the network I/F 91, the terminal device 2 corresponding to the address read out as above, to transmit the print data indicated by the ID code read out together with the address (step S2).

Upon receipt of the mentioned request transmitted from the image forming apparatus 1, via the communication device 24 (step S3), the terminal controller 210 of the terminal device 2 reads out the print data stored in the print data storage region 250, according to the request received (step S4). After step S4, the terminal controller 210 transmit the print data read out as above, to the image forming apparatus 1 that is the source of the request, via the communication device 24 (step S5).

Upon receipt of the print data transmitted from the terminal device 2 (step S6), the controller 100 of the image forming apparatus 1 controls the image forming device 12 so as to form an image according to the print data received, on the recording medium (step S7). After step S7, the controller 100 finishes the first information transmission process.

Now, when a plurality of image forming apparatuses are exhibited on the display device of the PC, for example in the form of icons, it is difficult for the user to designate, on the display device of the PC, the desired image forming apparatus as the transmission destination of the print data, unless the user can identify which of the icons corresponds to the desired image forming apparatus to be caused to execute the printing.

Many of the existing image forming apparatuses are compatible with the technique to utilize the short-range wireless communication such as the NFC. However, such a technique is not designed to facilitate the user to identify the desired image forming apparatus, out of a plurality of image forming apparatuses.

According to the first embodiment, in contrast, the information of the terminal device 2 is transmitted to the image forming apparatus 1 via the mobile device 3, and therefore when the user carrying the mobile device 3 actually moves to the image forming apparatus 1 that the user wishes to utilize for the printing, the corresponding image forming apparatus 1 can be caused to print the desired print data.

Accordingly, when the user is unable to designate the desired image forming apparatus on the terminal device 2, despite viewing the guidance on the terminal device 2 exhibiting the plurality of image forming apparatuses that are capable of executing the printing, because of being unable to identify the desired image forming apparatus among those image forming apparatuses exhibited, all the user has to do is to actually move to the desired image forming apparatus, and therefore the desired image forming apparatus can be easily made to execute the printing. Consequently, the plurality of image forming apparatuses can be more effectively utilized, and the efficiency of the user's operation can be further improved.

Hereunder, the print processing system 11 according to a second embodiment will be described. In the print processing system 11 according to the first embodiment, the address of the terminal device 2 and the ID code of the file to be printed are transmitted to the image forming apparatus 1, by the intermediation of the mobile device 3. In the print processing system 11 according to the second embodiment, in contrast, the address of image forming apparatus 1 is transmitted to the terminal device 2, by the intermediation of the mobile device 3.

When the user brings the mobile device 3 close to the reader-writer 7 of the image forming apparatus 1, the connection by the short-range wireless communication is established between the mobile device 3 and the image forming apparatus 1, via the reader-writer 7.

The controller 100 of the image forming apparatus 1 writes the address of the image forming apparatus 1 in the memory 30 of the mobile device 3, with which the connection by the short-range wireless communication has been established via the reader-writer 7. The controller 100 also writes, together with the address of the image forming apparatus 1, a predetermined ID code for identifying that the address written in the memory 30 corresponds to the address of the image forming apparatus 1, in the memory 30.

The mentioned information written in the memory 30 of the mobile device 3 is transmitted to the terminal device 2, when the user carrying the mobile device 3 moves to the terminal device 2, and brings the mobile device 3 close to the reader-writer 26 of the terminal device 2. In other words, the mobile device 3 serves as the transmission medium between the image forming apparatus 1 and the terminal device 2.

Figure 9:
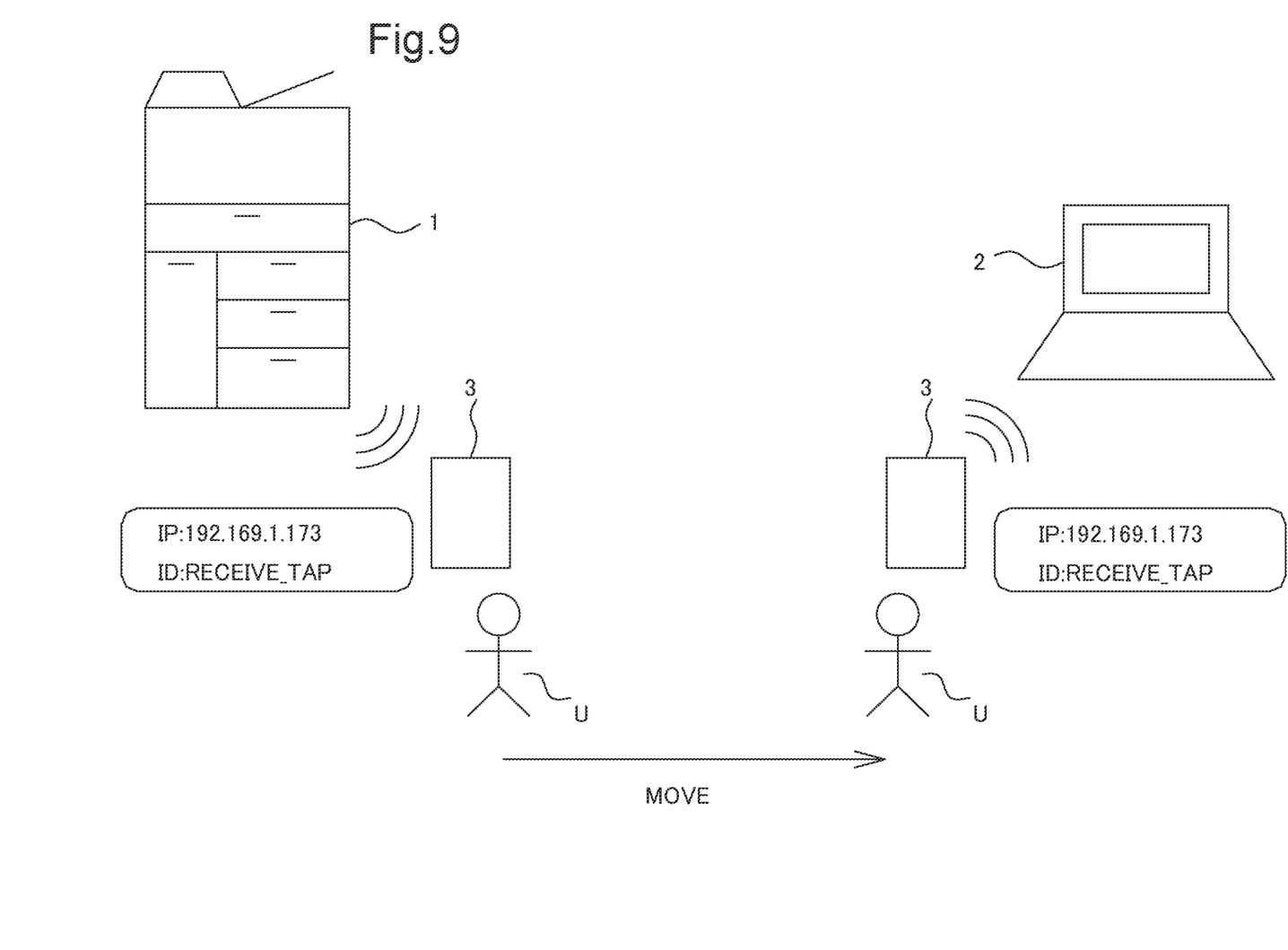
FIG. 9 is a schematic diagram for explaining an exemplary case where information of the image forming apparatus is transmitted to the terminal device through the intermediation of the mobile device.

FIG. 9 illustrates an exemplary case where the information of the image forming apparatus 1 is transmitted to the terminal device 2, by the intermediation of the mobile device 3. The IP address "192.169.1.173" and the ID code "RECEIVE_TAP" of the image forming apparatus 1 are transmitted to the terminal device 2, by the intermediation of the mobile device 3.

Figure 10:
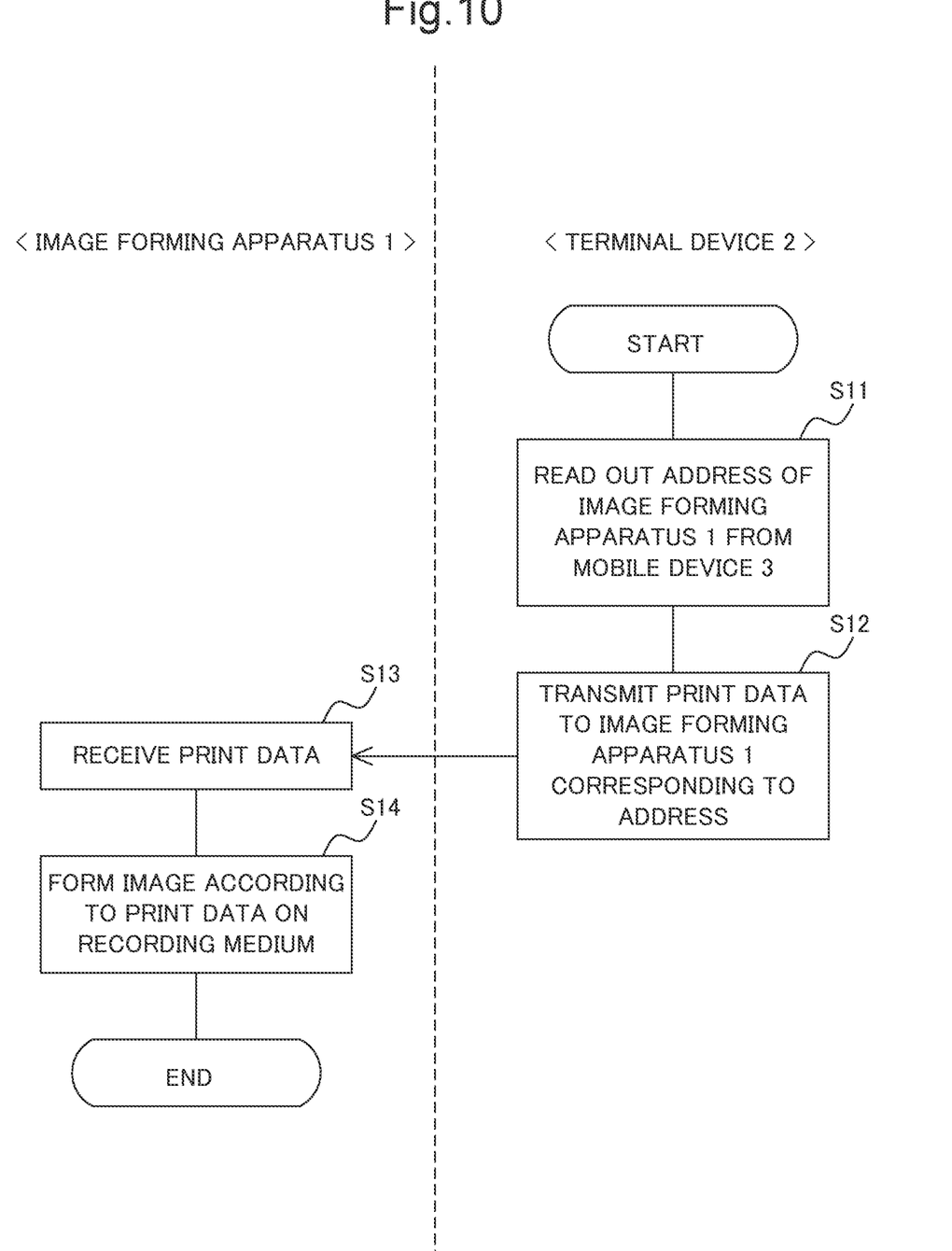
FIG. 10 is a flowchart showing an example of a second information transmission process.

Referring now to a flowchart shown in FIG. 10, a second information transmission process performed by the image forming apparatus 1 and the terminal device 2 will be described, from the point where the terminal device 2 reads out the address of the image forming apparatus 1 from the mobile device 3, to the point where the image forming apparatus 1 executes the printing.

The terminal controller 210 of the terminal device 2 reads out the address of the image forming apparatus 1 written in the memory 30, from the mobile device 3 with which the connection by the short-range wireless communication has been established via the reader-writer 26 (step S11).

In the case where the file to be printed is designated by the user in advance, the terminal controller 210 transmits the print data of the file to be printed designated in advance, to the image forming apparatus 1 corresponding to the address read out from the mobile device 3, via the communication device 24 (step S12). In contrast, in the case where the file to be printed is not designated in advance by the user, the terminal controller 210 stands by for the designation of the file to be printed. When the user designates the file to be printed, the terminal controller 210 transmits the print data of the designated file to be printed, to the image forming apparatus 1 corresponding to the address read out from the mobile device 3, via the communication device 24 (step S12).

Upon receipt of the print data transmitted from the terminal device 2, via the network I/F 91 (step S13), the controller 100 of the image forming apparatus 1 controls the image forming device 12 so as to form an image according to the print data received, on the recording medium (step S14). After step S14, the controller 100 finishes the second information transmission process.

According to the second embodiment, the information of the image forming apparatus 1 is transmitted to the terminal device 2 via the mobile device 3, and therefore when the user carrying the mobile device 3 actually moves to the image forming apparatus 1 that the user wishes to utilize for the printing, the corresponding image forming apparatus 1 can be caused to print the desired print data. Therefore, the same advantageous effects as those provided by the first embodiment can be attained.

To designate the file to be printed in advance, the virtual printer referred to in the first embodiment may be utilized. When the user selects the file to be printed through the operation device 22, and selects the virtual printer "Print to NFC" as the printer to be caused to execute the printing, the terminal controller 210 stores the print data of the file to be printed in the print data storage region 250. As result, the file to be printed can be designated in advance.

When the print data of the file to be printed is stored in the print data storage region 250, the terminal controller 210 causes the display device 473 to display the pop-up screen P1 shown in FIG. 6, as in the first embodiment.

According to the first embodiment, when the user brings the mobile device 3 close to the reader-writer 26 after the pop-up screen P1 is displayed, the terminal controller 210 writes the address of the terminal device 2 and the ID code of the file to be printed, in the memory 30 of the mobile device 3. According to the second embodiment, in contrast, the terminal controller 210 reads out the address of the image forming apparatus 1 from the memory 30 of the mobile device 3, and transmits the print data stored in the print data storage region 250, to the image forming apparatus 1 corresponding to the address read out as above.

To designate the file to be printed afterward also, the virtual printer may be utilized. Upon reading out the address of the image forming apparatus 1 from the mobile device 3, the terminal controller 210 of the terminal device 2 associates the address that has been read out and the virtual printer with each other. For example, when the address read out from the mobile device 3 corresponds to the image forming apparatus 1B represented by "Printer B", the terminal controller 210 assumes that the virtual printer "Print to NFC" is the "Printer B". When the user selects, through the operation device 22, the virtual printer as the printer to be caused to execute the printing, after the address that was read out and the virtual printer were associated with each other, the terminal controller 210 transmits the print data of the file to be printed to the image forming apparatus 1B, via the communication device 24.

Whereas the information of the terminal device 2 is transmitted to the image forming apparatus 1, by the intermediation of the mobile device 3 in the first embodiment, and the information of the image forming apparatus 1 is transmitted to the terminal device 2, by the intermediation of the mobile device 3 in the second embodiment, both ways are possible according to a third embodiment.

According to the third embodiment, however, the controller 100 of the image forming apparatus 1 and the terminal controller 210 of the terminal device 2 have to decide whether to utilize the information written in the mobile device 3, or to write new information in the mobile device 3, neglecting the information already written therein.

Upon reading out the information written in the memory 30 of the mobile device 3, with which the connection by the short-range wireless communication is established, and deciding that the information read out was not written by the terminal device 2, or upon deciding that no information is written in the memory 30 (memory 30 is vacant), the controller 100 of the image forming apparatus 1 writes the address of the image forming apparatus 1 and the predetermined ID code, in the memory 30. In other words, upon deciding that the information in the memory 30 was not written by the terminal device 2, but written by the image forming apparatus 1, the controller 100 overwrites the information in the memory 30.

In contrast, upon deciding that the information that has been read out was written by the terminal device 2 (i.e., the case shown in FIG. 7), the controller 100 of the image forming apparatus 1 erases the information in the memory 30, thus making the memory 30 vacant. Then the controller 100 performs the operation of step S2 in FIG. 8.

Upon reading out the information written in the memory 30 of the mobile device 3, with which the connection by the short-range wireless communication is established, and deciding that the information read out was not written by the image forming apparatus 1, or upon deciding that no information is written in the memory 30 (memory 30 is vacant), the terminal controller 210 of the terminal device 2 writes the address of the terminal device 2, and the ID code for identifying the print data stored in the print data storage region 250, in the memory 30. In other words, upon deciding that the information in the memory 30 was not written by the image forming apparatus 1, but written by the terminal device 2, the terminal controller 210 overwrites the information in the memory 30.

In contrast, upon deciding that the information that has been read out was written by the image forming apparatus 1 (i.e., the case shown in FIG. 9), the terminal controller 210 erases the information in the memory 30, thus making the memory 30 vacant. Then the terminal controller 210 performs the operation of step S12 in FIG. 10.

Here, the information written by the image forming apparatus 1 in the memory 30 includes the predetermined ID code "RECEIVE_TAP". The controller 100 of the image forming apparatus 1 and the terminal controller 210 of the terminal device 2 make the aforementioned decisions, depending on whether this ID code is included.

The disclosure may be modified in various manners, without limitation to the configuration according to the foregoing embodiments. Although the image forming apparatus according to the disclosure is exemplified by the multifunction peripheral in the embodiments, the disclosure is also applicable to different types of image forming apparatuses having the printer function.

Further, the configurations and processings according to the foregoing embodiments, described with reference to FIG. 1 to FIG. 10, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. A print processing system comprising:
   a plurality of image forming apparatuses;
   a terminal device; and
   a mobile device including a memory,
   wherein the terminal device includes:
   a first communication device that communicates with each of the plurality of image forming apparatuses via a network;
   a first wireless communication device that performs short-range wireless communication with the mobile device;
   a storage device in which print data is stored; and
   a first control device including a processor, and configured to act, when the processor executes a first control program, as a first controller that transmits the print data to one of the plurality of image forming apparatuses, via the first communication device,
   the plurality of image forming apparatuses each include:
   a second communication device that communicates with the terminal device, via the network;
   a second wireless communication device that performs the short-range wireless communication with the mobile device;
   an image forming device that forms an image on a recording medium; and
   a second control device including a processor, and configured to act, when the processor executes a second control program, as a second controller that controls the image forming device, upon receipt of the print data via the second communication device, so as to form an image based on the print data, on the recording medium,
   the first controller of the terminal device is capable of writing, via the first wireless communication device, information necessary for transmitting the print data in the memory of the mobile device, and the second controller of the image forming apparatus executes, upon reading out the necessary information written by the first controller from the memory of the mobile device, via the second wireless communication device, a first process necessary for transmitting the print data, and the second controller of the image forming apparatus is capable of writing, via the second wireless communication device, the necessary information in the memory of the mobile device, and the first controller of the terminal device executes, upon reading out the necessary information written by the second controller from the memory of the mobile device, via the first wireless communication device, a second process necessary for transmitting the print data, wherein the first controller of the terminal device writes a first address of the terminal device and an ID code for identifying the print data, in the memory of the mobile device via the first wireless communication device, as the necessary information, the second controller of the image forming apparatus requests, upon reading out the first address and the ID code from the memory of the mobile device, via the second wireless communication device, the terminal device corresponding to the first address to transmit the print data indicated by the ID code, via the second communication device, as the first process, and the first controller of the terminal device transmits the print data, upon receipt of the request via the first communication device, to the image forming apparatus that has made the request, via the first communication device.

2. The print processing system according to claim 1, wherein, upon reading out first information written in the memory of the mobile device, via the first wireless communication device, and deciding that the first information is the necessary information written by the first controller, the first controller of the terminal device overwrites the first address and the ID code on the first information in the memory, and the first controller erases, upon deciding that the first information is the necessary information written by the second controller, the first information in the memory and executes the second process.

3. A print processing system comprising:
a plurality of image forming apparatuses;
a terminal device; and
a mobile device including a memory,
wherein the terminal device includes:
  a first communication device that communicates with each of the plurality of image forming apparatuses via a network;
  a first wireless communication device that performs short-range wireless communication with the mobile device;
  a storage device in which print data is stored; and
  a first control device including a processor, and configured to act, when the processor executes a first control program, as a first controller that transmits the print data to one of the plurality of image forming apparatuses, via the first communication device,
the plurality of image forming apparatuses each include:
  a second communication device that communicates with the terminal device, via the network;
  a second wireless communication device that performs the short-range wireless communication with the mobile device;
  an image forming device that forms an image on a recording medium; and
  a second control device including a processor, and configured to act, when the processor executes a second control program, as a second controller that controls the image forming device, upon receipt of the print data via the second communication device, so as to form an image based on the print data, on the recording medium, the first controller of the terminal device is capable of writing, via the first wireless communication device, information necessary for transmitting the print data in the memory of the mobile device, and the second controller of the image forming apparatus executes, upon reading out the necessary information written by the first controller from the memory of the mobile device, via the second wireless communication device, a first process necessary for transmitting the print data, and the second controller of the image forming apparatus is capable of writing, via the second wireless communication device, the necessary information in the memory of the mobile device, and the first controller of the terminal device executes, upon reading out the necessary information written by the second controller from the memory of the mobile device, via the first wireless communication device, a second process necessary for transmitting the print data, wherein the second controller of the image forming apparatus writes a second address of the image forming apparatus in the memory of the mobile device via the second wireless communication device, as the necessary information, and the first controller of the terminal device transmits the print data, upon reading out the second address from the memory of the mobile device via the first wireless communication device, to the image forming apparatus corresponding to the second address via the first communication device, as the second process.

4. The print processing system according to claim 3, wherein, upon reading out second information written in the memory of the mobile device, via the second wireless communication device, and deciding that the second information is the necessary information written by the second controller, the second controller of the image forming apparatus overwrites the second address on the second information in the memory, and the second controller erases, upon deciding that the second information is the necessary information written by the first controller, the second information in the memory and executes the first process.

5. The print processing system according to claim 3, wherein, upon reading out the second address from the memory of the mobile device via the first wireless communication device, and deciding that the print data is not stored in the storage device, the first controller of the terminal device stands by for the print data to be stored in the storage device, and transmits the print data to the image forming apparatus corresponding to the second address, via the first communication device, when the print data is stored in the storage device.

6. A print processing system comprising:
a plurality of image forming apparatuses;
a terminal device; and a mobile device including a memory, wherein the terminal device includes:
- a first communication device that communicates with each of the plurality of image forming apparatuses via a network;
- a first wireless communication device that performs short-range wireless communication with the mobile device;
- a storage device in which print data is stored; and
- a first control device including a processor, and configured to act, when the processor executes a first control program, as a first controller that transmits the print data to one of the plurality of image forming apparatuses, via the first communication device, the plurality of image forming apparatuses each include:
- a second communication device that communicates with the terminal device, via the network;
- a second wireless communication device that performs the short-range wireless communication with the mobile device;
- an image forming device that forms an image on a recording medium; and
- a second control device including a processor, and configured to act, when the processor executes a second control program, as a second controller that controls the image forming device, upon receipt of the print data via the second communication device, so as to form an image based on the print data, on the recording medium, the first controller of the terminal device is capable of writing, via the first wireless communication device, information necessary for transmitting the print data in the memory of the mobile device, and the second controller of the image forming apparatus executes, upon reading out the necessary information written by the first controller from the memory of the mobile device, via the second wireless communication device, a first process necessary for transmitting the print data, and the second controller of the image forming apparatus is capable of writing, via the second wireless communication device, the necessary information in the memory of the mobile device, and the first controller of the terminal device executes, upon reading out the necessary information written by the second controller from the memory of the mobile device, via the first wireless communication device, a second process necessary for transmitting the print data, wherein the second controller of the image forming apparatus writes a predetermined ID code in the memory of the mobile device, together with the necessary information, via the second wireless communication device, the first controller of the terminal device decides whether the necessary information has been written by the second controller, depending on whether the ID code is included, and the second controller of the image forming apparatus decides whether the necessary information has been written by the first controller, depending on whether the ID code is included.

* * * * *